United States Patent [19]

Brooks et al.

[11] Patent Number: 5,974,440
[45] Date of Patent: Oct. 26, 1999

[54] MICROPROCESSOR WITH CIRCUITS, SYSTEMS, AND METHODS FOR INTERRUPT HANDLING DURING VIRTUAL TASK OPERATION

[75] Inventors: James E. Brooks, Addison; Robert R. Collins; Jonathan H. Shiell, both of Plano, all of Tex.

[73] Assignee: Texas Instruments Incorporated, Dallas, Tex.

[21] Appl. No.: 08/823,916

[22] Filed: Mar. 25, 1997

[51] Int. Cl.[6] .................................................. G06F 12/00
[52] U.S. Cl. ............................................ 709/109; 709/100
[58] Field of Search .................... 395/425, 700, 395/500; 709/107, 100

[56] References Cited

U.S. PATENT DOCUMENTS

| | | | |
|---|---|---|---|
| 4,974,159 | 11/1990 | Hargrove et al. | |
| 5,303,378 | 4/1994 | Cohen | 710/264 |
| 5,381,540 | 1/1995 | Adams et al. | 710/49 |
| 5,644,755 | 7/1997 | Wooten | 395/500 |
| 5,694,606 | 12/1997 | Pletcher et al. | 710/261 |
| 5,729,760 | 3/1998 | Poisner | 710/3 |
| 5,784,625 | 7/1998 | Walker | 710/260 |

Primary Examiner—Lucien U. Toplu
Assistant Examiner—George Opie
Attorney, Agent, or Firm—Robert D. Marshall, Jr.; Gerald E. Laws; Richard L. Donaldson

[57] ABSTRACT

In a microprocessor embodiment (26), the microprocessor is operable to multi-task a plurality of programs, wherein the plurality of programs include a virtual program (38, 40) operable in a virtual mode and a monitor program (36) in a protected mode. The microprocessor includes an interrupt handling circuit (30) for executing an interrupt handler in response to a hardware interrupt request signal (HIM•INTR). The microprocessor further includes an interrupt flag bit (IF) set in a like manner in both the virtual mode and the protected mode. The interrupt flag bit is set in a first state to inhibit receipt of the hardware interrupt request signal by the interrupt handling circuit, and the interrupt flag bit is set in a second state to enable receipt of the hardware interrupt request signal by the interrupt handling circuit. The microprocessor further includes a virtual mode control signal (VM•VME), wherein the virtual mode control signal is set in a first state to indicate a program is operating in a virtual mode and is set in a second state to indicate a program is not operating in a virtual mode. Still further, the microprocessor includes a mask bit (HIM) and circuitry (46) for copying the state of the interrupt flag bit to the mask bit when the virtual mode control signal is set in the second state. The copying circuitry does not copy in this manner when the virtual mode control signal is set in the first state. Still further, the microprocessor includes circuitry (INTR) for receiving an external interrupt request signal, and logic circuitry (52) for presenting the hardware interrupt request to said interrupt handling circuit in response to a combination of the external interrupt request signal and the mask bit.

34 Claims, 3 Drawing Sheets

MICROPROCESSOR WITH CIRCUITS, SYSTEMS, AND METHODS FOR INTERRUPT HANDLING DURING VIRTUAL TASK OPERATION

TECHNICAL FIELD OF THE INVENTION

The present embodiments relate to microprocessor-based computer systems, and are more particularly directed to such systems including a microprocessor with circuits, systems, and methods for interrupt handling during virtual task operation.

BACKGROUND OF THE INVENTION

Microprocessor-based computer systems have become prolific at all levels of the public and private sector. Because of this success and popularity, computer programs likewise have inundated the market. Despite the countless advances in both computer hardware and software, many major microprocessor developers have greatly attempted to maintain backward compatibility between new hardware and older software, that is, permitting the newer microprocessors to achieve vastly improved performance with newer software, while still allowing those same microprocessors to operate with older software. In order to maintain compatibility in whole or in part, various complex considerations arise. The embodiments described below deal with certain of these complex considerations, including the combination of multi-tasking and interrupt handling in microprocessor-based computer systems.

Multi-tasking microprocessors are those allowing various programs, or even tasks as part of those programs, to run near-simultaneously, with each program being presented with an environment so that it appears to the task, and often to the computer user, as if the microprocessor is only running a single task. Note that it is stated above that these tasks run "near-simultaneously". In actuality, the microprocessor commonly gives temporary control to each separate task and stores the state of the non-operating tasks; however, the switching rate as well as the microprocessor operation speeds are so high that it typically appears to the computer user that the tasks are operating simultaneously.

Multi-tasking presents yet another level of complexity in the area of operating in different modes for different tasks, particularly in view of modes used for certain older software. For example, newer microprocessors often include at least two modes, a first mode or native mode allowing more advanced operations (e.g., to support multi-tasking) and a second mode to ensure that older software can run on newer microprocessors. For example, INTEL manufactured the original 8086 microprocessor many years ago, and that microprocessor used "real addressing" and, thus, 8086 programs were said to have run in real mode. Since that time, newer microprocessors have evolved into the 80286, the 80386, the 80486 and now a fifth generation, including the PENTIUM. The PENTIUM, as well as many of its predecessors, typically operates in a native mode referred to as the "protected mode", which allows complex data handling, privilege checking, and other features to better support multi-tasking. However, in order to also provide compatibility with programs written for the 8086 "real mode", these processors also include a "virtual mode", which is a hybrid of the protected and real modes. When operating in the virtual mode, the 8086 program perceives that it has sole control of the microprocessor and expects it to operate in a mode comparable to the 8086. Presently, the virtual mode is entered by enabling the VM (virtual mode) flag in the Eflag register of the microprocessor. In general, the virtual mode permits one or more computer programs written for 8086 microprocessors to operate in conjunction with a monitor program (e.g., WINDOWS) on a more advanced x86 microprocessor under a multi-tasking environment. For example, many 8086 programs currently exist which will operate on more modern day 80486 or PENTIUM processors, where that 8086 program runs under the virtual mode (and therefore hereafter is referred to as a "virtual 8086 program") while the monitor program itself actually runs under the more advanced protected mode. The monitor program, therefore, acts as a conduit between the virtual 8086 program and the actual microprocessor to perform various emulation as known in the art. As explained below, however, this perception to the virtual 8086 program may cause operational inefficiencies, particularly in the context of interrupts as described below.

There are various types of interrupts, but they all have in common that they create a change of flow in the normal flow of computer program execution. Thus, microprocessors include some level of interrupt handling capability. However, when combined with multi-tasking capabilities, the interrupt control and handling architecture is likely to become even more complicated because one task may use interrupts given certain expectations which, without some intervention, may adversely affect another task. To better understand these complexities, first consider a common example of interrupt enabling and disabling as used by the older 8086 programs where there was no expectation of another task being multi-tasked with the 8086 program. Specifically, many 8086 programs repeatedly issue the CLI and STI instructions to handle external interrupts. As known in the art, the CLI instruction is used in the 8086 to dear an interrupt flag ("IF") in the flags register of the 8086 microprocessor so that the microprocessor would not accept any other external interrupt until the 8086 program later issued an STI instruction to reset IF. For example, if the 8086 program desired to access an index/register pair (e.g., a personal computer CMOS RAM), it typically must first program a value into the index port and thereafter read data out of the data port, while not allowing an external interrupt to occur between those two events. Thus, to achieve this activity, the 8086 program may first issue the CLI instruction before programming the value to the index port so that the microprocessor is not interrupted before the value is thereafter read from the data port Thus, after reading the data port the 8086 program would issue the STI instruction, thereby allowing the microprocessor to then accept other hardware interrupt requests. While the above approach using the CLI and STI instructions to affect the interrupt flag was generally acceptable where the 8086 program was the sole program operating for the 8086 microprocessor, it becomes a problem when that same program operated as a virtual 8086 program on a multi-tasking 80x86 microprocessor.

Given the above, various approaches arose to lessen the potential effects of the typical use of the CLI and STI instructions by an 8086 program. For example, one prior multi-tasking approach had the monitor program trap all instances where the 8086 program issued either a CLI or STI instruction, and emulate the anticipated action back to the virtual 8086 program. This approach was found to be inefficient because often the emulation required a great deal of time. Another approach is shown in UK Patent Application 9217612.2, published Mar. 24, 1993, and hereby incorporated herein by reference. In this approach, INTEL further added to its more recent x86 microprocessors an extension to its virtual mode, where this extension is often referred to as virtual 8086 mode extensions. As its name suggests, the virtual 8086 mode extensions is a further refinement of the virtual mode and, therefore is enabled in addition to enabling VM as described above. More particularly, the virtual 8086 mode extensions are enabled in the PENTIUM by setting the VME bit in the CR4 control register. With the VME bit enabled, additional virtual interrupt flags in the Eflags register come into play. Particularly, these architected bits include a virtual interrupt flag bit ("VIF bit"). Using this bit, the newer microprocessor includes additional code and circuitry which must determine if the VME bit (and the VM bit) is enabled. If so, for an instance of a CLI or STI instruction from a virtual 8086 program, the microprocessor allows such instruction to affect only the VIF bit and, therefore, not to change the value of the IF bit. Further, the value of the VIF bit is combined with a virtual interrupt pending bit ("VIP bit"), and the result is used by the emulation from the monitor program to more efficiently permit interrupt handling while the VME bit is enabled. While this approach improved upon prior approaches, it included various drawbacks. For example, it required additional microinstruction complexity because it had to determine whether or not VME was enabled and to alter either the IF bit or the VIF bit accordingly. In addition, this approach required additional complexity outside of the microprocessor chip, namely, that which was added to any external monitor program. For example, the various WINDOWS operating systems were required to include additional functionality to perform the emulation stated above in order to accommodate the virtual 8086 program running with the VME bit enabled. The additional complexity may reduce performance, and also creates the possibility that the creator of a monitor program does not adequately account for the nuances of the combination of multi-tasking, interrupt handling, and operating under virtual 8086 mode extensions.

In view of the above, there arises a need to address the drawbacks of current systems and to provide a microprocessor with circuits, systems, and methods for interrupt handling during virtual task operation.

SUMMARY OF THE INVENTION

The present embodiments relate to microprocessor-based computer systems, and are more particularly directed to such systems including a microprocessor with circuits, systems, and methods for interrupt handling during virtual task operation. In a microprocessor embodiment, the microprocessor is operable to multi-task a plurality of programs, wherein the plurality of programs include a virtual program operable in a virtual mode and a monitor program in a protected mode. The microprocessor includes an interrupt handling circuit for executing an interrupt handler in response to a hardware interrupt request signal. The microprocessor further includes an interrupt flag bit set in a like manner in both the virtual mode and the protected mode. The interrupt flag bit is set in a first state to inhibit receipt of the hardware interrupt request signal by the interrupt handling circuit, and the interrupt flag bit is set a second state to enable receipt of the hardware interrupt request signal by the interrupt handling circuit. The microprocessor further includes a virtual mode control signal, wherein the virtual mode control signal is set in a first state to indicate a program is operating in a virtual mode and is set in a second state to indicate a program is not operating in a virtual mode. Still further, the microprocessor includes a mask bit and circuitry for copying the state of the interrupt flag bit to the mask bit when the virtual mode control signal is set in the second state. The copying circuitry does not copy in this manner when the virtual mode control signal is set in the first state. Still further, the microprocessor includes circuitry for receiving an external interrupt request signal, and logic circuitry for presenting the hardware interrupt request to the interrupt handling circuit in response to a combination of the external interrupt request signal and the mask bit. Other circuits, systems, and methods are also disclosed and claimed.

DETAILED DESCRIPTION OF THE PREFERRED EMBODIMENTS

Figure 1:
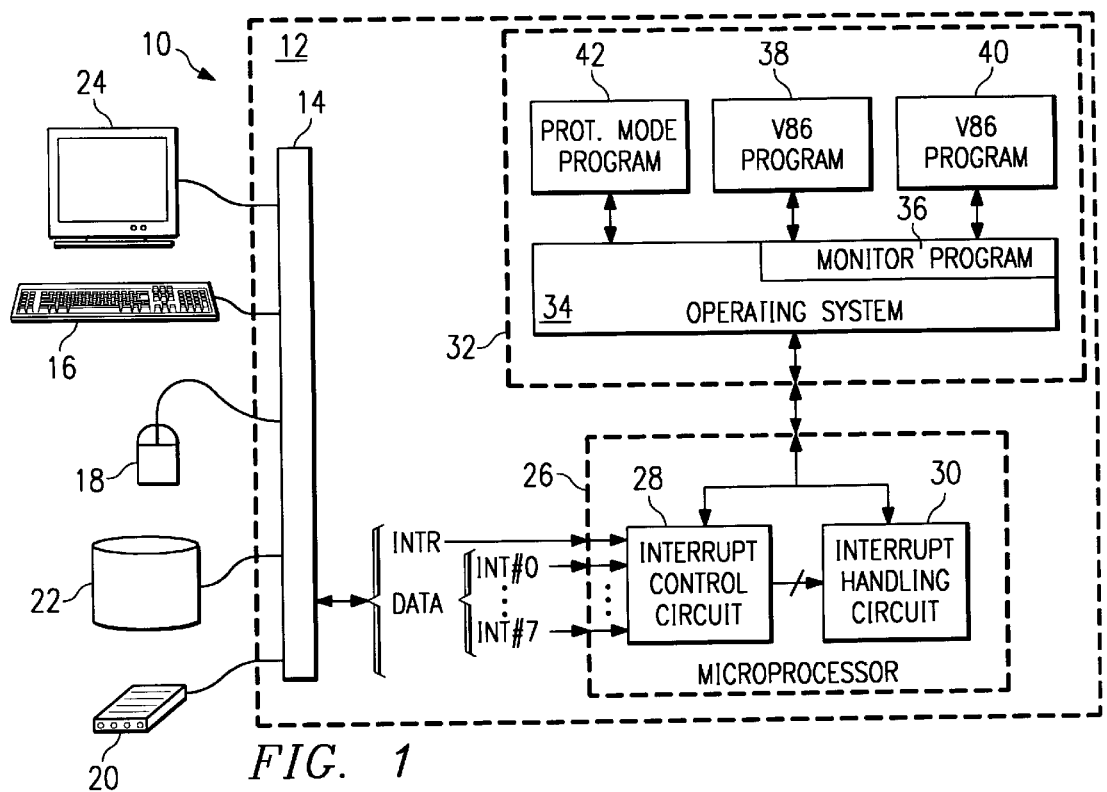
FIG. 1 illustrates a computer system in which the preferred embodiments are implemented, and includes a microprocessor with an interrupt control circuit and an interrupt handling circuit.

FIG. 1 illustrates a diagrammatic depiction of a computer system designated generally at 10, and of the type in which the present embodiments may be utilized. System 10 includes a computer 12, which includes various blocks described below. Note that numerous other blocks and interconnections could be included within computer 12, but for purposes of this embodiment they are not shown to simplify the discussion. Continuing, therefore, computer 12 includes an input/output interface 14 which is connected for communication with various peripherals. For example, computer 12 receives user input from various sources, such as a keyboard 16 and a mouse 18 or other pointing device. In addition, computer 12 may receive information from, or output information through, a modem 20. Modem 20 is shown as an external device for purposes of illustration but, of course, could be internal to the computer as known in the art Computer 12 also bi-directionally communicates with a storage device 22, which may be either internal or external storage and actually may represent several different types of storage devices, including one or more of a floppy disk drive, a hard disk drive, an optical read/write device, and other such devices. Clearly, other input devices and sources are known in the art for communicating user data to computer 12. Lastly, computer 12 outputs information to a display 24 to communicate that information to the user and, while not shown, the information could be further output to a printer or alternative mechanism for providing meaningful information to the user.

Given the various peripherals identified above, note that various information is depicted in connection with input/output interface 14 which may be communicated from those devices to a microprocessor 26 within computer 12. Of particular relevance to the present embodiments, various peripherals may provide off-chip or external (i.e., outside of microprocessor 26) interrupt signals. In the example of FIG. 1, these signals include a single request signal designated INTR as well as an eight bit interrupt number signal designated INT#0 through INT#7. The INTR signal is preferably the same as in the 80×86 standard and is received on a separate external pin on microprocessor 26. As known in the art, the INTR signal represents a request from a peripheral to interrupt the operation of microprocessor 26. The values of INT#0 through INT#7 are commonly received along eight lines within a data bus, while that data bus typically is wider than eight lines (e.g., 32 lines with only eight shown to simplify the drawing) and may also communicate other types of data as well as addresses. The values of INT#0 through INT#7 are also standard to the 80×86 art and combine to form an interrupt number identifying the particular type of interrupt being requested. For example, a serial interface like input/output interface 14 could issue an external interrupt request (i.e., INTR) to microprocessor 26 along with an interrupt number (i.e., INT#0 through INT#7) representing that the interface just received a character from keyboard 16. Note that this type of interrupt communication as well as the types of external interrupts are known in the art. For example, the 80×86 architecture includes 256 such interrupts (numbered 0 through 255), and these interrupts are also referred to in the art as "hardware" interrupts. This is because these interrupts are typically set by hardware components or peripherals. Additionally, interrupts may be provided by a separate interrupt controller (i.e., external from the microprocessor) which receives and prioritizes interrupt information from various hardware, and then presents the interrupt request and number to the microprocessor. When microprocessor 26 receives this interrupt information, it is coupled to an interrupt control circuit 28 which further communicates with an interrupt handing circuit 30. In general, circuit 28 serves at least two functions. First, it presents a hardware interrupt request to interrupt hardware circuit 30 when appropriate to interrupt the operation of microprocessor 26. Second, it presents a take virtual interrupt request to interrupt hardware circuit 30 when it is appropriate to present a virtual interrupt to an 8086 program running in a virtual mode described below.

Microprocessor 26 is preferably a single chip microprocessor including the interrupt-related circuits set forth above. Clearly, however, microprocessor 26 may be of various different types which contemplate the features described with respect to FIGS. 1 through 3, and it will include various other components and interconnections; indeed, such aspects need not be detailed at this point but many other optional aspects are shown in greater detail below in connection with FIG. 4. At this point, however, note further that microprocessor 26 generally operates in a native or protected mode, and further supports a virtual mode (as well as its extensions) to be compatible with those modes as they are known in the 80×86 art. Thus, microprocessor 26 necessarily includes multi-tasking capabilities.

For purposes of illustration, microprocessor 26 responds to various levels of software control designated generally at 32, while other software may be included but is not shown (e.g., BIOS control). Software control 32 includes an operating system 34. Within its native protected mode, microprocessor 26 is further operable to perform an emulation sub-mode, where the emulation sub-mode is preferably compatible with the virtual 8086 mode and its extensions of the 80×86 architecture. In this regard, it is known that a microprocessor operating in the virtual 8086 mode provides a certain level of hardware functionality which must be further augmented by a so-called monitor program (sometimes referred to as a virtual 8086 monitor). Thus, FIG. 1 further includes such a monitor program designated at 36. Typically, monitor program 36 is a type of system program which is part of the operating system and, therefore, it is shown in this manner in FIG. 1; in other words, it is anticipated that operating systems will be created with the virtual 8086 mode in mind and, therefore, will necessarily include a monitor program function to take advantage of the virtual 8086 mode. Clearly, however, the monitor program function could be separate and apart from the operating system. In either event, what characterizes the monitor program is that it operates between operating system 34 and one or more virtual 8086 programs to assist and provide the virtualization function. For purposes of illustration, therefore, FIG. 1 further includes two virtual 8086 programs designated at 38 and 40 which communicate with monitor program 36. Lastly, because microprocessor 26 may multi-task programs other than virtual 8086 programs, it is further shown by way of example that a separate protected mode program 42 communicates directly with operating system 34, with it understood therefore that program 42 is a program other than one running in the virtual 8086 mode.

Figure 2:
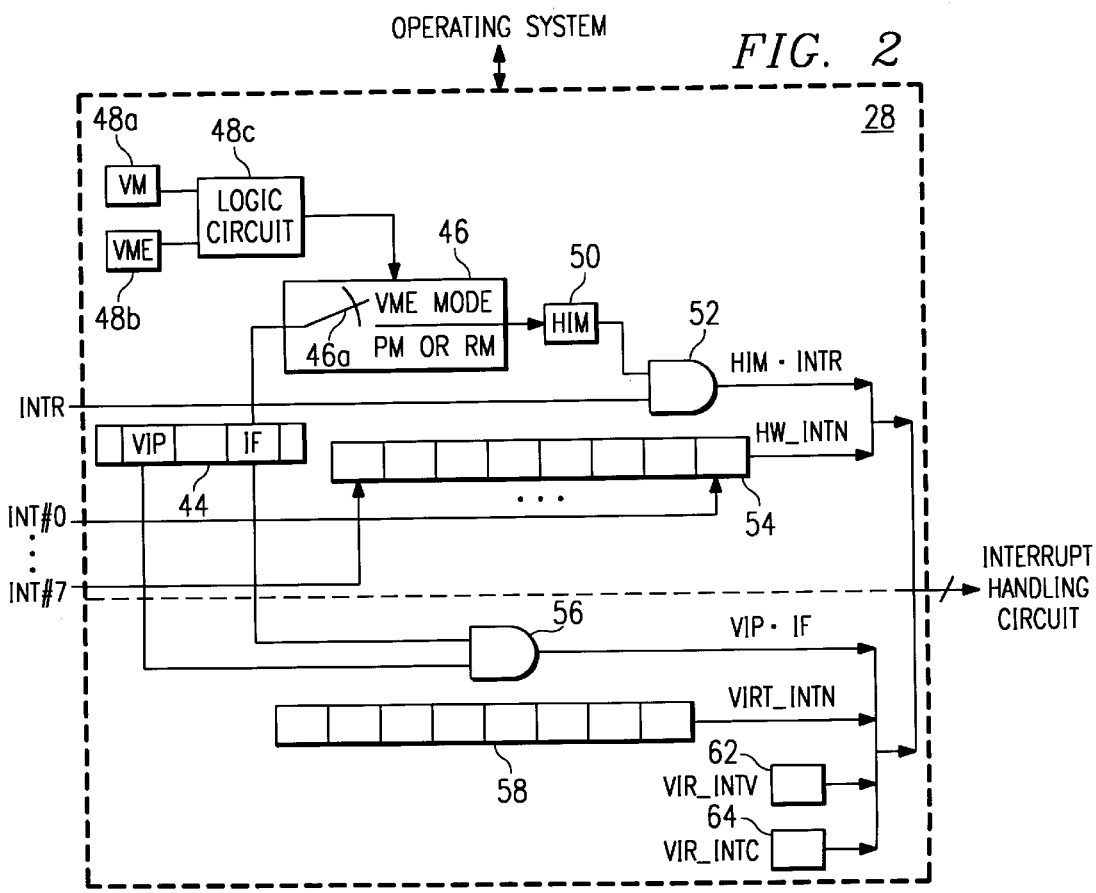
FIG. 2 illustrates a detailed diagram of the interrupt control circuit within the computer system of FIG. 1.

FIG. 2 illustrates additional details of the circuitry of interrupt control circuit 28 from FIG. 1. Generally, the circuit of FIG. 2 may be most easily understood by considering separately the upper and lower halves of the Figure; therefore, a dashed line is included within the Figure to separate it into halves in this manner. Nevertheless, one skilled in the art will appreciate the relatedness and mutual benefit of the circuit as a whole. Turning then to the various components and connections of FIG. 2, circuit 28 includes a register 44 which corresponds to the Eflag register in the 80×86 architecture. The Eflag register 44 may include various bits written by operating system 34 (although the connection is not shown to simplify the diagram), where those bits represent the state of a current task. While the Eflag register typically includes many bits which are not otherwise shown, two of the Eflag bits are particularly relevant to external interrupt techniques and, therefore, are shown in register 44. Particularly, these two bits include an interrupt flag ("IF") bit and a virtual interrupt pending ("VIP") bit. For purposes of clarity to person skilled in the art, these bit names are the same as those used in the INTEL PENTIUM microprocessor, but it should be understood that such usage is not intended as a limitation since the functionality of those bits differs in certain respects from the INTEL usage as evident below. Note also that while register 44 is shown in the upper half of FIG. 2, the VIP and IF bits also impact the operation of the lower half of the Figure as described later. In any event, as a preliminary matter, immediately below is an introductory explanation of the IF and VIP bits, while a more detailed explanation is deferred until later in connection with the operation of the components of FIG. 2.

The IF bit in the present embodiments is used to selectively mask external interrupts so that they sometimes do not disturb (i.e., do not interrupt) operation of microprocessor 26. Before detailing its connections and operations, a brief review is made of the IF bit in the INTEL architecture. In the INTEL architecture, the IF bit may be controlled in certain modes to mask an external interrupt from the microprocessor; in other words, if the IF bit is set in a given state (e.g., a logic 0), then any maskable external interrupt arriving on the INTR pin will be ignored by the INTEL microprocessor. Indeed, faced with this limitation, INTEL added to its more recent microprocessors a separate architected bit known as the virtual interrupt flag ("VIF") bit. Given the additional VIF bit, code within the INTEL format must determine whether a virtual 8086 program is running in an 8086 virtual mode extension. This test may be made with reference to both the VM and VME bits which are set when the microprocessor is operating under 8086 virtual mode extension. If the microprocessor is operating under 8086 virtual mode extension, when that virtual program attempts to manipulate the IF bit (e.g., by issuing either a CLI or STI instruction) the microcode must instead prevent the change to the IF bit from occurring and, alternatively, alter the VIF bit. Thereafter, during operation under 8086 virtual mode extension, the VIF bit rather than the IF bit is used to control interruption of the virtual 8086 program. As detailed below, however, the present embodiments do not require a separate architected VIF bit (although one may be emulated in certain circumstances for compatibility purposes if desired). Instead, the IF bit is set and reset by all programs in a like manner, regardless of whether they are virtual 8086 programs and regardless of whether or not they are operating under virtual 8086 mode extensions or under protected mode. In other words, under the present embodiments the immediate effect of either the CLI or STI instruction is the same regardless of whether or not the microprocessor is operating under virtual 8086 mode extensions.

The VIP bit in the present embodiments is set in a manner compatible with that in the INTEL standard, that is, it is set by the monitor program for at least the following reasons: (1) when an external interrupt is pending for a virtual 8086 program; or (2) when an emulated external interrupt is pending for a virtual 8086 program. The first instance occurs in response to an interrupt as in the manner set forth above with respect to FIG. 1. For example, if a peripheral device issues an interrupt request to the INTR input in connection with a virtual 8086 program, then monitor program 36 intercepts that request and sets the VIP bit to a state (e.g., a logic 1) indicating that an interrupt is pending for the virtual 8086 program. The second instance occurs when monitor program 36 itself performs the interrupt functionality, but then reflects the appearance of that interrupt to the virtual 8086 program. In either instance, it appears to the virtual 8086 program that an external interrupt is being presented to it, with that appearance being recognized by the program because the virtual 86 interrupt service routine associated with the external interrupt is invoked upon resumption to the virtual 8086 program in a manner that is indistinguishable by the virtual 8086 program (i.e., automatic invocation of an interrupt service routine for INT-00 through INT-255).

Having generally described the IF and VIP bits of Eflags register 44, the following now discusses the remainder of circuit 28 and, for sake of convenience, first addresses the upper half, and second addresses the lower half, of FIG. 2.

The value of the IF bit is connected to the input of a selective copy circuit 46. For purposes of illustration, selective copy circuit 46 is shown to include a switch 46a, with it understood that the circuit may be constructed in various fashions to accomplish the functionality described below. Copy circuit 46, and more particularly switch 46a, is controlled according to the value of a logic circuit 48c. The output of logic circuit 48c is set in a manner described below, that is, it determines when both VM bit 48a and VME bit 48b are set to indicate that microprocessor 26 is operating a particular virtual 8086 program (e.g., program 38 or 40 in FIG. 1) under virtual 8086 mode extensions. Thus, the output of logic circuit 48c may be thought of as a control signal to indicate whether or not the microprocessor is operating under virtual 8086 mode extension. The output of selective copy circuit 46 is connected to a bit register 50 which, for reasons apparent below, is identified as a hardware interrupt mask ("HIM") bit 50. HIM bit 50 operates as a latch to hold its input value. Further, the value of HIM bit 50 is connected to a first input of a logic circuit 52; given the example values of the bits as stated later, logic circuit 52 is preferably a logic AND gate circuit 52. The second input of logic AND gate circuit 52 is connected to receive the INTR value received externally from microprocessor 26. Consequently, one skilled in the art will appreciate that the output of logic AND gate circuit 52 provides a value of HIM•INTR. This value provides a hardware interrupt request which is output to interrupt handling circuit 30.

The upper half of FIG. 2 also includes a hardware interrupt number register 54 (abbreviated on the Figure as HW__INT#). Register 54 represents any type of storage capability for storing the eight bit interrupt number signal designated INT#0 through INT#7. In the present embodiment, because the interrupt number is eight bits, obviously register 54 stores at least eight bits as well; however, a different size store would be used if the interrupt number signal were a different size (for example, if more than 256 interrupts were available, more than eight bits would be required). The interrupt number stored in register 54 is also available as an output to interrupt handling circuit 30.

Turning now to the lower half of FIG. 2, it includes a logic circuit 56. Again, given the example values of the bits as stated later, logic circuit 56 is preferably a logic AND gate circuit 56. The first input of logic AND gate circuit 56 is connected to the VIP bit, while the second input of that gate is connected to the IF bit. Consequently, one skilled in the art will appreciate that the output of logic AND gate circuit 56 provides a value of VIP•IF. This value is also output to interrupt handling circuit 30.

The lower half of FIG. 2 further includes a total of ten additional bits of information written by operating system 34 and, more particularly, by monitor program 36 (again, the connections to these bits from operating system 34 is not shown to simplify the diagram). These values are used by interrupt handling circuit 30 as described below. Turning now to the specific bits, they include a set of eight bits stored in a register 58, as well as individual bits stored in registers 62 and 64. The eight bit register 58 stores the value of the interrupt number to be presented to a virtual 8086 program. For convenience, therefore, this value is referred to as a virtual interrupt number and is represented by the abbreviation VIRT__INTN. As appreciated below, this value becomes useful when an external interrupt, or an emulated external interrupt, is pending for a virtual 8086 program. Bit registers 62 and 64 also include information used when a reflected external interrupt, or an emulated external interrupt, is pending for a virtual 8086 program. Bit register 62 stores a value abbreviated as VIR__INTV. The value of VIR__INTV indicates whether the value in register 58 (i.e., VIRT__INTN) should be considered valid. Lastly, bit register 64 stores a value abbreviated as VIR__INTC. The value of VIR__INTC determines, as detailed below, the flow of control from microprocessor 26 to either execute an interrupt vector or pass control back to monitor program 36 after the interrupt vector has been set up.

The operation of the circuit of FIG. 2 is also best understood by considering separately the upper and lower halves of that Figure. Turning then to the upper half, note that it operates to control whether or not an external interrupt is allowed to reach, and therefore to interrupt the operation of, the hardware of microprocessor 26. Recall that VM bit register 48a indicates whether or not microprocessor 26 is operating in a virtual 8086 mode, and VME bit register 48b indicates whether or not that mode may be extended. Note that it is stated that VME bit register 48b indicates whether or not that mode "may" be extended because, in some instances, VME bit register 48b is set while VM bit register 48a is not. In these instances, the microprocessor is not running in VME mode, but would switch to VME mode if VM bit register 48a is set while VME bit register 48b remains set Given the above, note that the microprocessor may operate in the protected mode, the real mode, the VM mode (i.e., just VM bit register 48a is set), or the VME mode (i.e., both VM bit register 48a and VME register 48b are set). Thus, logic circuit 48c includes the necessary logic to determine which of these four possibilities is occurring, and controls selective copy circuit 46 in response to its determination as described below.

When the microprocessor is operating in VM mode but without its extensions (i.e., VM bit register 48a is set and VME register 48b is cleared), it is preferable that microcode included within the microprocessor will detect any attempt to change the IF bit. For example, if a CLI instruction were issued when the microprocessor is operating in VM mode but without its extensions, the microcode would detect this occurrence and generate an exception, typically causing a fault back to monitor program 36 without allowing any change to occur to the IF bit. Note that in this instance, logic circuit 48c detects that the microprocessor is operating in non-extended VM mode and, therefore, takes no action with respect to copy circuit 46. Thus, copy circuit 46 will remain in its then current state.

When the microprocessor is operating in VME mode, then control circuit 48c causes selective copy circuit 46 to de-couple the IF bit from HIM bit 50. In other words, switch 46a opens when the microprocessor is operating in VME mode so that any change to the IF bit is not copied to HIM bit 50. To demonstrate this action in the figure, the symbol VME MODE is shown above switch 46a to indicate it moves to its open position when operating under virtual 8086 mode extensions (i.e., both VM bit register 48a and VME register 48b are set). Note therefore, the value of IF may be changed numerous times during that operation but that changed value is not copied to HIM register bit 50.

When the microprocessor is operating in neither VME mode or VM mode (e.g., when it is operating in protected mode or real mode), then selective copy circuit 46 copies the value of IF from register 44 to the HIM register bit 50. To demonstrate this action in the figure, the symbol PM OR RM (i.e., protected mode or real mode) is shown underneath switch 46a to indicate it moves to its dosed position.

Given the operation of selective copy circuit 46, note that it affects the actual control of a hardware interrupt of microprocessor 26. First, note that the external request from the INTR pin may be masked through logic AND gate circuit 52 based on the value of HIM bit 50. Second, because the operation of selective copy circuit 46 affects the value of HIM bit 50, then its operation also affects whether or not the INTR signal is masked rather than being passed on to interrupt handling circuit 30. To better demonstrate this action, consider below the examples first where microprocessor 26 is not under virtual 8086 mode extensions and second where microprocessor is under virtual 8086 mode extensions.

As stated above, when microprocessor 26 is operating in neither VME mode nor VM mode then the value of the IF bit is copied to HIM bit 50. Recall from the above that the IF bit is set and reset by all programs in the present embodiments, regardless of whether under virtual 8086 mode extensions and regardless of whether or not a program is an 8086 program. Thus, the IF bit is set to a logic 1 when it is desired to allow external interrupts to the microprocessor while it is cleared to a logic 0 when it is desired to inhibit, or mask, any external interrupts to the microprocessor.

Figure 4:
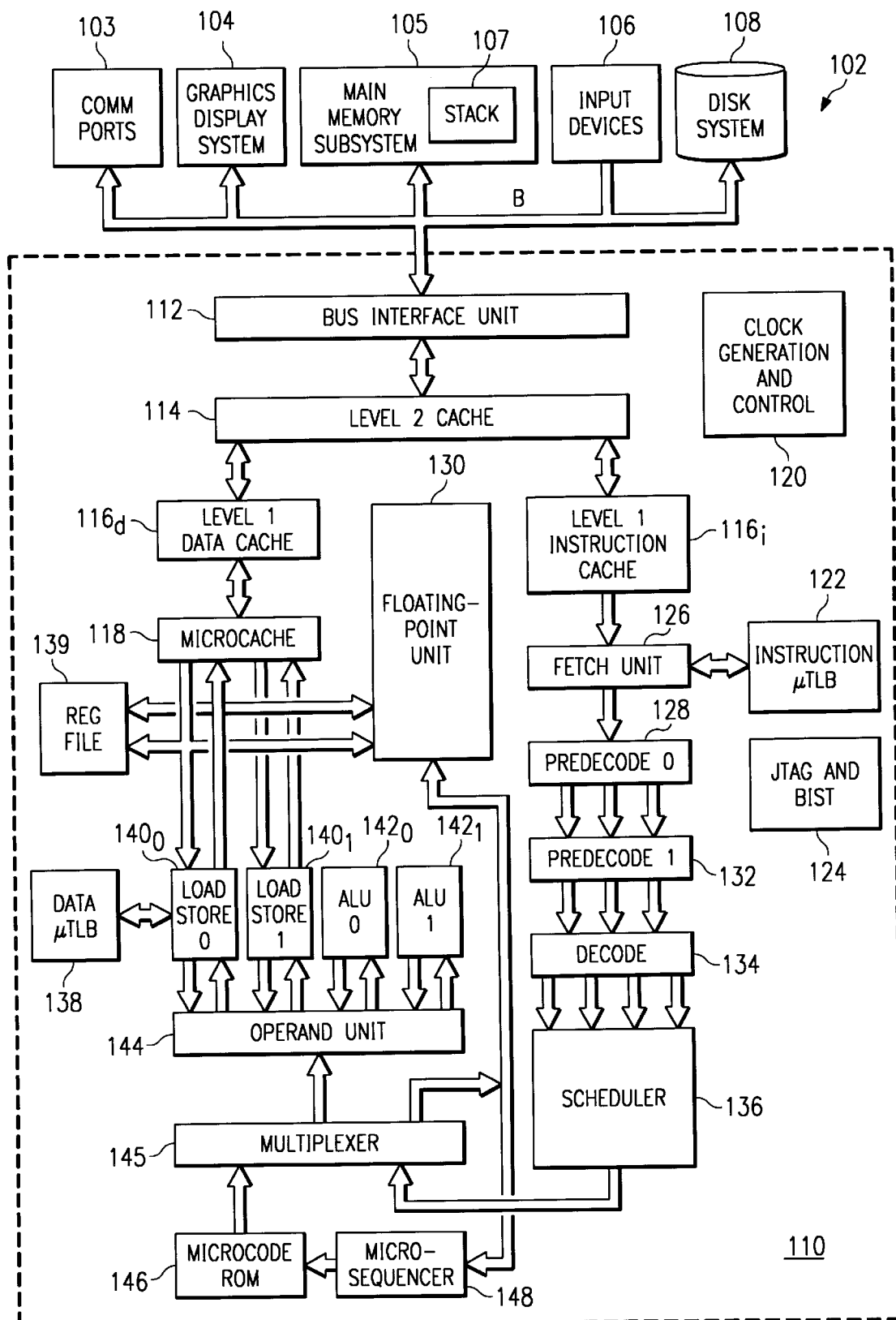
FIG. 4 illustrates an exemplary data processing system within which the preferred embodiments may be implemented.

Continuing with the virtual 8086 mode extensions, assume first that program 42 (e.g., a protected mode program) dears the IF bit (e.g., by issuing a CLI instruction). Since the current example is a protected mode program, then this value of the IF bit is copied to HIM bit 50 and, therefore, input as a logic 0 to logic AND gate circuit 52. Assume thereafter that a peripheral now issues an external interrupt to microprocessor 26 by asserting a high signal at the INTR pin. This value is also coupled to logic AND gate circuit 52. However, because of the logic 0 from HIM bit 50, the value of INTR is masked, or inhibited, and does not pass to interrupt handling circuit 30. Consequently, microprocessor 26 is not interrupted. Continuing with the example of operation in the protected mode, assume now that program 42 sets the IF bit (e.g., by issuing an STI instruction). Again, the value of the IF bit is copied to HIM bit 50 and input as a logic 1 to logic AND gate circuit 52. Assume thereafter that a peripheral now issues an external interrupt to microprocessor 26 by asserting a high signal at the INTR pin. In this instance, because of the logic 1 from HIM bit 50 input to logic AND gate circuit 52, and further due to the high signal at INTR, logic AND gate circuit 52 will output a high signal to interrupt handling circuit 30. In response, interrupt handling circuit 30 will interrupt the operation of microprocessor 26. Thus, the high signal from the output of logic AND gate circuit 52 may be thought of as a separate hardware interrupt request which actually makes it to the portion of microprocessor 26 (i.e., interrupt handling circuit 30) so as to cause an interrupt. Stated alternatively, the high value from HIM bit 50 to logic AND gate circuit 52 allows the high value from the INTR pin to pass through logic AND gate circuit 52 on to interrupt handling circuit 30. In either event, and as shown in FIG. 4, below, a microprocessor in accordance with the preferred embodiment may be executing one or more instructions when circuit 30 receives the hardware interrupt request (i.e., the passed value of INTR). In this embodiment, upon receiving the hardware interrupt request from circuit 28, interrupt handling circuit 30 sets up and executes the interrupt handler corresponding to the requested interrupt only after completion of any instruction currently executing. Thus, after completion of execution of any such instruction, interrupt handling circuit 30 evaluates the contents of register 54 to identify the particular interrupt number (i.e., HW_IN) being requested. In response, circuit 30 performs the requested interrupt using known protected mode techniques.

Recall that when microprocessor 26 is operating under virtual 8086 mode extensions, the value of the IF bit is not copied to HIM bit 50. Note that this operation has particular benefit when one or more virtual 8086 programs are running. In particular, most virtual 8086 programs were written to run on an 8086 processor. As a result, those programs were written with the expectation that the program would have sole control over the microprocessor. As a result, these programs often change the value of the IF bit (to either mask or permit external interruption of the microprocessor). In a multi-tasking environment, however, this constant changing could have negative effects on the performance of other tasks, as well as on the monitor program. For example, if the monitor program must intercept and emulate each attempt by the 8086 program to alter the IF bit, then the emulation time may harm performance. As stated earlier, this also led INTEL to require the use of an alternative, the VIF bit. In the present embodiments, however, because the value of the IF bit is not copied to HIM bit 50 during virtual 8086 mode extensions, then the virtual 8086 program is free to alter the IF bit as often as it desires because this action will not affect HIM bit 50 and, therefore, will not affect whether or not an external interrupt on the INTR pin is actually passed to interrupt handling circuit 30. Thus, performance is improved without the necessity of additional code and complexity surrounding the VIF bit.

Figure 3:
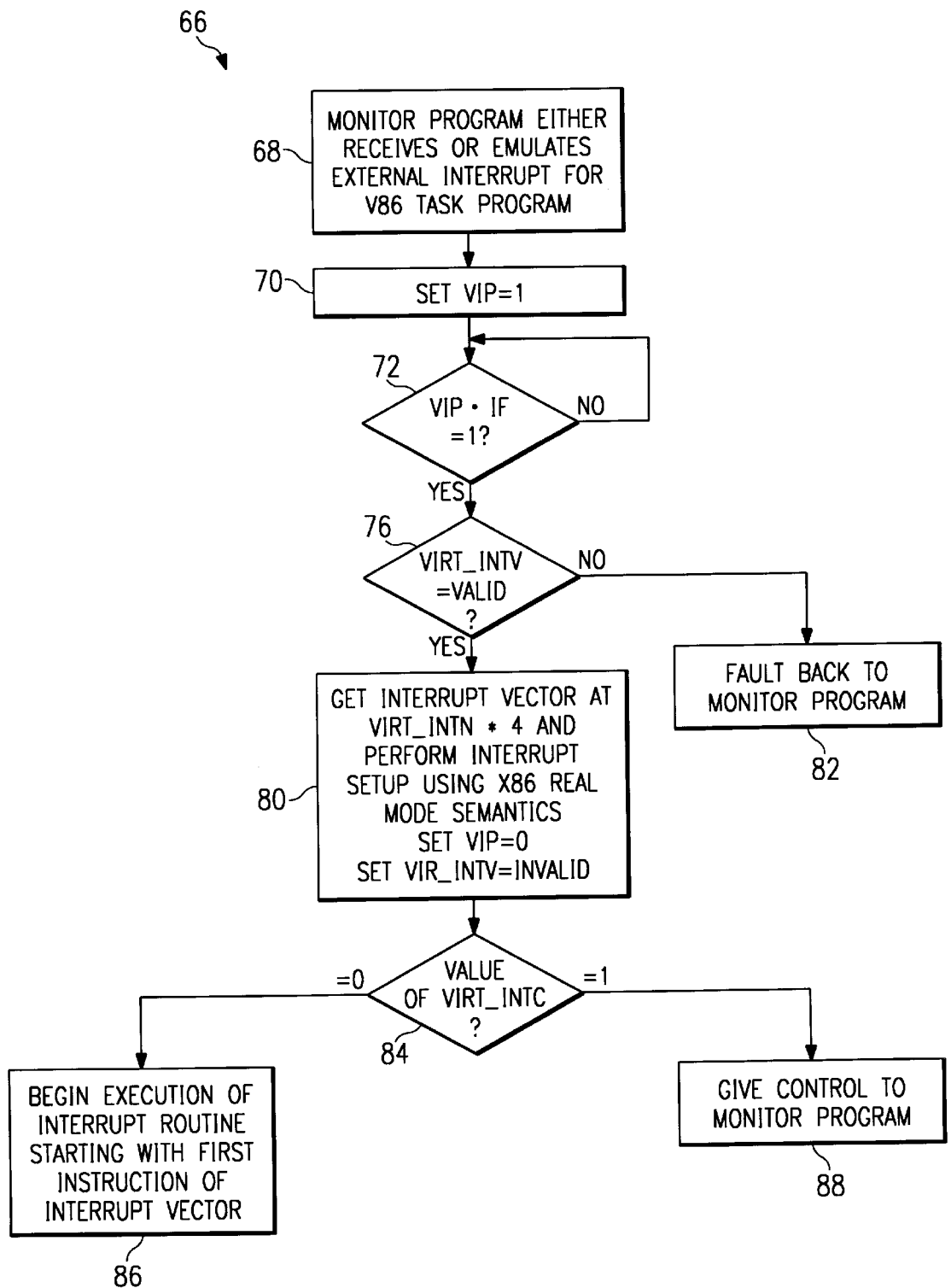
FIG. 3 illustrates a flow chart of the operational steps of the interrupt handling circuit in response to the circuitry within the lower half of the interrupt control circuit shown in FIG. 1.

The above discussion of the operation of the upper half of FIG. 2 therefore demonstrates the passage of external interrupts to actually interrupt the microprocessor operation; FIG. 3 illustrates a preferred method 66 of operation for the lower half of FIG. 2, which operates to present an interrupt to a virtual 8086 program. Method 66 begins with step 68 where monitor program 36 either receives an actual external interrupt which must then be reflected to the virtual 8086 program, or where monitor program 36 emulates an external interrupt for a virtual 8086 program when, in fact, an actual corresponding external interrupt did not occur. As an example of an actual external interrupt, assume virtual 8086 program 38 earlier required an access to storage device 22 by way of an interrupt and that access is now complete. Storage device 22 may now respond (either directly or through some other device) with its own interrupt to indicate completion of the access. Again, therefore, a signal will be asserted to the INTR pin of microprocessor 26 along with an interrupt number which will pass to register 54 of interrupt control circuit 28. Thus, in step 68, monitor program 36 is aware of this actual interrupt and places an appropriate value into register 58. Note that this value is that which is determined by the monitor program as appropriate given the then current operations and may not be the same number which was received as an external interrupt number (i.e., VIRT_INTN may not necessarily be the same as the received value of HW_INTN). In addition, monitor program 36 sets the value of bit register 62 (i.e., VIRT_INTV) to indicate that the contents of register 58 are valid. Turning now to an example of an emulated external interrupt, assume virtual 8086 program 38 requested information at a system resource (e.g., disk or input/output port) but that the information sought was located in a cache and therefore the access was unnecessary. In this event, virtual 8086 program 36 anticipates receiving an interrupt to notify it that the access is complete. However, because the access was not made to the requested device, no such interrupt actually occurred. To properly respond to the virtual 8086 program, however, monitor program 36 then emulates such an interrupt and presents it to virtual 8086 program 38. In this instance, monitor program 36 writes the appropriate interrupt number directly to register 58 and, again, sets the value of bit register 62 (i.e., VIRT_INTV) to indicate that the contents of register 58 are valid.

In step 70, and having either reflected or emulated an external interrupt in step 68, the method (preferably by monitor program 36) sets the VIP bit of register 44 to a state indicating that an external interrupt (either reflected or one which was emulated) is pending for the virtual 8086 program.

After step 70, in the preferred embodiment monitor program 36 passes control to interrupt handling circuit 30. Thus, interrupt handling circuit 30 includes the necessary circuitry to accomplish the following steps, except where control is passed back to monitor program 36. Consequently, these operations occur as a result of structure on the microprocessor chip. Thus, the following steps may be accomplished, for example, using microcode, a state machine, a combination of the two, or by alternative structure which may be ascertained by a person skilled in the art. In all events, by including such on-chip support, performance is increased. Note further that circuit 30 is shown as a separate item within FIG. 2 only for purposes of discussing its functionality, while it should be understood that in actuality its functions may be accomplished in part using existing architecture located across the microprocessor, such as its ALU for logic functions, its microcode ROM for any microcode operations, and so forth.

Step 72 determines whether the virtual 8086 program is accepting external interrupts. Particularly, recall that the virtual 8086 program may clear the value of the IF bit to a logic 0 when it does not want to receive an external interrupt. Thus, using the output of logic AND gate circuit 56, step 72 may repeatedly evaluate the combination of VIP•IF. VIP was already set in step 70. However, IF should only be set by the 8086 virtual program to a logic 1 only once that program is again ready to accept an external interrupt. Thus, step 72 remains in a loop until IF is set in this manner. Once IF is set, it is then known both that a virtual interrupt is pending for the virtual 8086 program, and that the virtual 8086 program is allowing an interrupt to be taken by the microprocessor; in other words, the output of logic AND gate circuit 56 may be thought of as a "take virtual interrupt request" to interrupt handling circuit 30, that is, a request that the now pending virtual interrupt is acceptable to take because the virtual 8086 task has set the IF bit. Thus, when interrupt handling circuit 30 receives this take virtual interrupt request, the flow continues to step 76.

Step 76 evaluates the value of bit register 62 (i.e., VIRT_INTV) which, recall from above, indicates whether the value in register 58 (i.e., VIRT_INTV) is valid. Recall from step 68, above, the value of VIRT_INTV at this point should indicate a valid state assuming it has not been changed since step 68. Thus, assuming no intervening event has occurred which set the value of VIRT_INTV to invalid, the flow continues to step 80. To the contrary, if VIRT_INTV has been changed to invalid, the flow continues to step 82. In step 82, an exception is taken back to monitor program 36. In the preferred embodiment, this exception is a general protection fault which is detected by monitor program 36 which must then evaluate the immediately preceding events and act accordingly. Given the ability to fault back to monitor program 36 in this manner, note that VIRT_INTV can be set to invalid for whatever reason if control is desired to fault back to monitor program 36 in step 82. For example, some programs may have the ability to modify the IDTR register available in certain x86 microprocessors; in this case, the step of locating the interrupt vector described below in step 80 may cause inaccurate results. Thus, in that particular instance, it may undesirable to allow step 80 to occur and, instead, VIRT_INTV is set to invalid prior to that time. As a result, instead of the calculation of step 80, the fault of step 82 will occur, thereby returning control back to monitor program 36. Note also that rather than returning control back to monitor program 36, an alternative embodiment would include an additional register and/or control so that a corrected base value could be determined based on the effect of the IDTR register. In this event, the corrected base value could then be used and the location of the interrupt vector described below could be achieved without having to fault back to the monitor program Step 80 completes the set up for actually executing the first instruction of the interrupt handler. Thus, in step 80, the on chip method locates the appropriate interrupt vector. In the preferred embodiment, this occurs by multiplying the interrupt number for the virtual 8086 program (i.e., VIRT_INTN times four and performing the interrupt using steps which are compatible with real mode semantics. In other words, steps which would be taken under real mode to set up the interrupt are taken, such as pushing the current state of the machine (e.g., code segment, instruction pointer, and flags register) and identifying and loading the appropriate code segment and instruction pointer which identify the first instruction to perform the interrupt. Note that by stating above that the preferred semantics are compatible with the real mode semantics it is intended that the preferred semantics may operate such that the virtual 8086 program perceives operation to occur purely in real mode semantics, while in fact additional operations not detectable by the virtual 8086 program may occur such as protected mode page translation on the "real mode" address. In addition to locating the interrupt vector, step 80 also dears the VIP bit since the particular interrupt intended for the virtual 8086 program is set up to be performed and will, therefore, no longer be pending. Step 80 also sets the VIR_INTV bit to invalid so that any later step may evaluate that bit and know not to rely upon the value in register 58 until it has been written with a new value and the state of VIR_INTV has been returned to valid.

Step 84 permits a last chance for monitor program 36 to prevent the on chip routine from commencing execution of the interrupt instructions. Particularly, step 84 evaluates the value of bit register 64 (i.e., VIR_INTC). If VIR_INTC is set to a particular state (e.g., a logic 0), the flow continues to step 86. On the other hand, if VIR_INTC is set 21 to an opposite state (e.g., a logic 0), the flow continues to step 88. Step 88 passes control back from the on-chip routine to monitor program 36. Thus, in an instance where monitor program 36 desires control of the microprocessor without the current interrupt being executed, it may set the value of VIR_INTC in the interim so that steps 84 and 88 return control back to monitor program 36. This operation could occur whenever desirable. For example, monitor program 36 may have more than one interrupt pending and, therefore, desire control to set up another interrupt. In this regard, note that the dedicated hardware for performing steps 72 through step 80 may be used one or more successive times by faulting back to monitor program 36 and, in each instance, setting up another interrupt (i.e., going through the steps above through the step of identifying the appropriate interrupt vector, pushing the current information and identifying and loading the information to begin executing the interrupt vector). Still other examples will be ascertainable by a person skilled in the art. In any event, again the passage of control may be accomplished by way of an exception, and here the exception preferably indicates that control is passed to monitor program 36 due to the setting of VIR_INTC.

Step 86 completes the handling of the interrupt to be presented to the virtual 8086 program by beginning execution of the interrupt routine by executing the first instruction in the interrupt vector. Thus, the interrupt is performed from is point forward according to known principles and, therefore, may conclude according to such principles and depending upon the particular interrupt being performed.

Note from the above that steps 72, 76, 80, 84, and 86 allow on chip setup and execution of the requested interrupt handler in response to the output of logic AND gate circuit 56 and further due to the various information provided by register 58 as well as bit registers 62 and 64. While this operation is preferred, an alternative embodiment would replace those steps and have the output of logic circuit 70 pass control back to monitor program 34 which, at that point, could evaluate the current state and emulate the virtual interrupt according to known techniques.

Having described the above embodiments, FIG. 4 illustrates a block diagram of a microprocessor embodiment into which the above embodiments may be incorporated. Referring now to FIG. 4, an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 4, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 4 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus dock from bus B; the frequency of the internal clock phases, in this example, may be selectably programmed as a multiple of the frequency of the bus clock.

As is evident in FIG. 4, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around cache 114, by treating certain bus reads and writes as "not cacheable". Level 2 cache 114, as shown in FIG. 4, is connected to two level 1 caches 116; level 1 data cache $116_d$ is dedicated to data, while level 1 instruction cache $116_i$ is dedicated to instructions. Power consumption by microprocessor 110 is minimized by only accessing level 2 cache 114 only in the event of cache misses of the appropriate one of the level 1 caches 116. Furthermore, on the data side, microcache 118 is provided as a level 0 cache, which in this example is a fully dual-ported cache.

As shown in FIG. 4 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $144_0$, $144_2$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write back : This stage stores the results of the execution in registers or in memory |

Referring back to FIG. 4, the pipeline stages noted above are performed by various functional blocks within microprocessor 110. Fetch unit 126 generates instruction addresses from the instruction pointer, by way of instruction micro-translation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases.

Scheduler 136 reads up to four AOps from the decode queue at the output of decode unit 134, and assigns these AOps to the appropriate execution units. In addition, the operand unit 144 receives and prepares the operands for execution, As indicated in FIG. 4, operand unit 144 receives an input from scheduler 136 and also from microcode ROM 148, via multiplexer 145, and fetches register operands for use in the execution of the instructions. In addition, according to this example, operand unit 144 performs operand forwarding to send results to registers that are ready to be stored, and also performs address generation for AOps of the load and store type.

Microsequencer 150, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 4, as well as the descriptions above such as those relating to the prior Figures, one skilled in the art may appreciate that system 10 of FIG. 1, and the circuit embodiments to accomplish the descriptions accompanying FIGS. 2 and 3, may be incorporated in connection with various components shown in FIG. 4. For example, microprocessor 110 could be used as microprocessor 26 from FIG. 1, in which case the on chip routines described above may be included within microcode ROM 146. Various related functionality may be further performed by the appropriate circuitry within FIG. 4.

From the above, one skilled in art may appreciate various benefits of the present embodiments. For example, a microprocessor in accordance with the various embodiments may efficiently handle various external interrupts with a reduced amount of monitor program intervention. As another example, various additional code and complexity are not needed to set and reset an additional VIF bit within the Eflag register of the microprocessor. As still another example, while the microprocessor of FIG. 4 depicts an exemplary microprocessor to benefit from the inventive embodiments, other microprocessor architectures could benefit as well. Indeed, these benefits and examples serve further to demonstrate that while the present embodiments have been described in detail, various substitutions, modifications or alterations could be made to the descriptions set forth above without departing from the inventive scope. Indeed, numerous examples have been cited above. In addition to those examples, the order of the many steps from FIG. 3 may in certain instances be arranged in different fashion, and certain of those steps may be removed while others are added. As another example, the states of the bits stated above are only by way of example and, therefore, changing those states may necessitate alternative logic structures. As yet another example, while registers have been shown as preferred storage devices, alternative storage structures (e.g., memory) could be used as well. Still other alternatives will be ascertainable by a person skilled in the art, and all of the above demonstrates the flexibility of the inventive scope which is defined by the following claims.

What is claimed is:

1. A microprocessor for multi-tasking a plurality of programs, wherein the plurality of programs comprise a virtual program operable in a virtual mode and a monitor program in a protected mode, said microprocessor comprising:
   an interrupt handling circuit for executing an interrupt handler in response to a hardware interrupt request signal;
   an interrupt flag bit set in a like manner in each of said virtual mode and said protected mode, wherein said interrupt flag bit is set in a first state to inhibit receipt of the hardware interrupt request signal by said interrupt handling circuit, and wherein said interrupt flag bit is set in a second state to enable receipt of the hardware interrupt request signal by said interrupt handling circuit;
   a virtual mode control signal, wherein said virtual mode control signal is set in a first state to indicate a program is operating in a virtual mode, and wherein said virtual mode control signal is set in a second state to indicate a program is not operating in a virtual mode;
   a mask bit;
   circuitry for copying the state of said interrupt flag bit to said mask bit when said virtual mode control signal is set in the second state and for not copying the state of said interrupt flag bit to said mask bit when said virtual mode control signal is set in the first state;
   circuitry for receiving an external interrupt request signal; and
   logic circuitry for presenting the hardware interrupt request to said interrupt handling circuit in response to a combination of the external interrupt request signal and the mask bit.

2. The microprocessor of claim 1 wherein said logic circuitry presents the hardware interrupt request to the interrupt handling circuit in response to the external interrupt request signal and said mask bit comprising a copy of said interrupt flag bit in the second state.

3. The microprocessor of claim 1 wherein the microprocessor executes instructions, and wherein said interrupt handling circuit comprises circuitry for executing the interrupt handler in response to the hardware interrupt request immediately after completion of any instruction in execution by the microprocessor during receipt of the hardware interrupt request.

4. The microprocessor of claim 1 and further comprising circuitry for storing an interrupt number and coupled to said interrupt handling circuit, wherein said circuit for executing an interrupt handler in response to a hardware request signal is further responsive to the interrupt number.

5. The microprocessor of claim 1 wherein said logic circuitry comprises a first logic circuitry, and further comprising:
   a virtual interrupt pending bit, wherein said virtual interrupt pending bit is set in a first state to indicate an interrupt is pending for the virtual program, and wherein said virtual interrupt pending bit is set in a second state to indicate an interrupt is not pending for the virtual program; and
   second logic circuitry for presenting a take virtual interrupt request signal to said interrupt handling circuit in response to a combination of said interrupt flag bit and said virtual interrupt pending bit.

6. The microprocessor of claim 5 wherein said second logic circuitry presents the take virtual interrupt request signal to said interrupt handling circuit in response to a combination of said interrupt flag bit being in the second state and said virtual interrupt pending bit being in the first state.

7. The microprocessor of claim 5 wherein said interrupt handling circuit further comprises circuitry for setting up an interrupt handler in response to the take virtual interrupt request signal.

8. The microprocessor of claim 7 wherein said circuitry for setting up an interrupt handler in response to the take virtual interrupt request signal comprises setting up an interrupt handler in response to the take virtual interrupt request signal using real mode compatible semantics.

9. The microprocessor of claim 1 and further comprising circuitry for storing a virtual interrupt number and coupled to said interrupt handling circuit, wherein said interrupt handling circuit comprises circuitry for executing an interrupt handler in response to the virtual interrupt number.

10. The microprocessor of claim 9 and further comprising a bit for indicating whether or not the virtual interrupt number is valid.

11. The microprocessor of claim 10 wherein said interrupt handling circuit further comprises:
    circuitry for evaluating said bit for indicating whether or not the virtual interrupt number is valid; and
    circuitry for passing control to the monitor program in response to determining that the virtual interrupt number is not valid.

12. The microprocessor of claim 9 and further comprising a bit for indicating that the monitor program requests control of the microprocessor prior to execution of the interrupt handler in response to the virtual interrupt number;
    wherein said interrupt handling circuit further comprises:
       circuitry for evaluating said bit for indicating that the monitor program requests control of the microprocessor prior to execution of the interrupt handler in response to the virtual interrupt number; and
    circuitry for passing control to the monitor program in response to determining that the monitor program requests control of the microprocessor prior to execution of the interrupt handler in response to the virtual interrupt number.

13. The microprocessor of claim 1 wherein said logic circuitry comprises a first logic circuitry, and further comprising:
    a virtual interrupt pending bit, wherein said virtual interrupt pending bit is set in a first state to indicate an interrupt is pending for a virtual program, and wherein said virtual interrupt pending bit is set in a second state to indicate an interrupt is not pending for the virtual program; and
    second logic circuitry for presenting a take virtual interrupt request signal to the monitor program in response to a combination of said interrupt flag bit and said virtual interrupt pending bit.

14. The microprocessor of claim 13 wherein said second logic circuitry presents the take virtual interrupt request signal to the monitor program in response to a combination of said interrupt flag bit being in the second state and said virtual interrupt pending bit being in the first state.

15. A microprocessor for multi-tasking a plurality of programs, wherein the plurality of programs comprise a virtual program operable in a virtual mode and a monitor program in a protected mode, said microprocessor comprising:

an interrupt handling circuit for executing an interrupt handler in response to a hardware interrupt request signal;

an interrupt flag bit set in a like manner in each of said virtual mode and said protected mode, wherein said interrupt flag bit is set in a first state to inhibit receipt of the hardware interrupt request signal by said interrupt handling circuit, and wherein said interrupt flag bit is set in a second state to enable receipt of the hardware interrupt request signal by said interrupt handling circuit;

a virtual mode control signal, wherein said virtual mode control signal is set in a first state to indicate a program is operating in a virtual mode, and wherein said virtual mode control signal is set in a second state to indicate a program is not operating in a virtual mode;

a mask bit;

circuitry for copying the state of said interrupt flag bit to said mask bit when said virtual mode control signal is set in the second state and for not copying the state of said interrupt flag bit to said mask bit when said virtual mode control signal is set in the first state;

circuitry for receiving an external interrupt request signal; and first logic circuitry for presenting the hardware interrupt request to said interrupt handling circuit in response to a combination of the external interrupt request signal and the mask bit;

a virtual interrupt pending bit, wherein said virtual interrupt pending bit is set in a first state to indicate an interrupt is pending for the virtual program, and wherein said virtual interrupt pending bit is set in a second state to indicate an interrupt is not pending for the virtual program;

second logic circuitry for presenting a take virtual interrupt request signal to said interrupt handling circuit in response to a combination of said interrupt flag bit and said virtual interrupt pending bit, wherein said second logic circuitry presents the take virtual interrupt request signal to said interrupt handling circuit in response to a combination of said interrupt flag bit being in the second state and said virtual interrupt pending bit being in the first state; and wherein said interrupt handling circuit further comprises circuitry for setting up an interrupt handler in response to the take virtual interrupt request signal.

16. The microprocessor of claim 15 wherein said circuitry for setting up an interrupt handler in response to the take virtual interrupt request signal comprises setting up an interrupt handler in response to the take virtual interrupt request signal using real mode compatible semantics.

17. The microprocessor of claim 13 and further comprising:

circuitry for storing an interrupt number and coupled to said interrupt handling circuit, wherein said circuit for executing an interrupt handler in response to a hardware request signal is further responsive to the interrupt number; and circuitry for storing a virtual interrupt number and coupled to said interrupt handling circuit, wherein said interrupt handling circuit comprises circuitry for executing an interrupt handler in response to the virtual interrupt number.

18. The microprocessor of claim 17 and further comprising a bit for indicating whether or not the virtual interrupt number is valid.

19. The microprocessor of claim 18 wherein said interrupt handling circuit further comprises:

circuitry for evaluating said bit for indicating whether or not the virtual interrupt number is valid; and circuitry for passing control to the monitor program in response to determining that the virtual interrupt number is not valid.

20. The microprocessor of claim 17 and further comprising a bit for indicating that the monitor program requests control of the microprocessor prior to execution of the interrupt handler in response to the virtual interrupt number;

wherein said interrupt handling circuit further comprises:

circuitry for evaluating said bit for indicating that the monitor program requests control of the microprocessor prior to execution of the interrupt handler in response to the virtual interrupt number; and circuitry for passing control to the monitor program in response to determining that the monitor program requests control of the microprocessor prior to execution of the interrupt handler in response to the virtual interrupt number.

21. A microprocessor-based computer system, comprising:

an input interface;

a plurality of peripheral devices coupled to said input interface, wherein selected ones of said plurality of peripheral devices are operable to issue an external interrupt request signal;

a main memory; and a microprocessor for multi-tasking a plurality of programs, wherein the plurality of programs comprise a virtual program operable in a virtual mode and a monitor program in a protected mode, said microprocessor comprising:

an interrupt handling circuit for executing an interrupt handler in response to a hardware interrupt request signal;

an interrupt flag bit set in a like manner in each of said virtual mode and said protected mode, wherein said interrupt flag bit is set in a first state to inhibit receipt of the hardware interrupt request signal by said interrupt handling circuit, and wherein said interrupt flag bit is set in a second state to enable receipt of the hardware interrupt request signal by said interrupt handling circuit;

a virtual mode control signal, wherein said virtual mode control signal is set in a first state to indicate a program is operating in a virtual mode, and wherein said virtual mode control signal is set in a second state to indicate a program is not operating in a virtual mode;

a mask bit;

circuitry for copying the state of said interrupt flag bit to said mask bit when said virtual mode control signal is set in the second state and for not copying the state of said interrupt flag bit to said mask bit when said virtual mode control signal is set in the first state;

circuitry for receiving the external interrupt request signal; and logic circuitry for presenting the hardware interrupt request to said interrupt handling circuit in response to a combination of the external interrupt request signal and the mask bit.

22. The system of claim 21 wherein said logic circuitry presents the hardware interrupt request to the interrupt handling circuit in response to the external interrupt request signal and said mask bit comprising a copy of said interrupt flag bit in the second state.

23. The system of claim 21 wherein the microprocessor executes instructions, and wherein said interrupt handling circuit comprises circuitry for executing the interrupt handler in response to the hardware interrupt request immediately after completion of any instruction in execution by the microprocessor during receipt of the hardware interrupt request.

24. The system of claim 21 wherein the microprocessor further comprises circuitry for storing an interrupt number and coupled to said interrupt handling circuit, wherein said circuit for executing an interrupt handler in response to a hardware request signal is further responsive to the interrupt number.

25. The system of claim 21 wherein said logic circuitry comprises a first logic circuitry, and said microprocessor further comprises:

a virtual interrupt pending bit, wherein said virtual interrupt pending bit is set in a first state to indicate an interrupt is pending for the virtual program, and wherein said virtual interrupt pending bit is set in a second state to indicate an interrupt is not pending for the virtual program; and second logic circuitry for presenting a take virtual interrupt request signal to said interrupt handling circuit in response to a combination of said interrupt flag bit and said virtual interrupt pending bit.

26. The system of claim 25 wherein said second logic circuitry presents the take virtual interrupt request signal to said interrupt handling circuit in response to a combination of said interrupt flag bit being in the second state and said virtual interrupt pending bit being in the first state.

27. The system of claim 25 wherein said interrupt handling circuit further comprises circuitry for setting up an interrupt handler in response to the take virtual interrupt request signal.

28. The microprocessor of claim 27 wherein said circuitry for setting up an interrupt handler in response to the take virtual interrupt request signal comprises setting up an interrupt handler in response to the take virtual interrupt request signal using real mode compatible semantics.

29. The microprocessor of claim 21 wherein said microprocessor further comprises circuitry for storing a virtual interrupt number and coupled to said interrupt handling circuit, wherein said interrupt handling circuit comprises circuitry for executing an interrupt handler in response to the virtual interrupt number.

30. The system of claim 29 wherein said microprocessor further comprises a bit for indicating whether or not the virtual interrupt number is valid.

31. The system of claim 30 wherein said interrupt handling circuit further comprises:

circuitry for evaluating said bit for indicating whether or not the virtual interrupt number is valid; and circuitry for passing control to the monitor program in response to determining that the virtual interrupt number is not valid.

32. The microprocessor of claim 29 wherein said microprocessor further comprises a bit for indicating that the monitor program requests control of the microprocessor prior to execution of the interrupt handler in response to the virtual interrupt number;

wherein said interrupt handling circuit further comprises:
circuitry for evaluating said bit for indicating that the monitor program requests control of the microprocessor prior to execution of the interrupt handler in response to the virtual interrupt number; and
circuitry for passing control to the monitor program in response to determining that the monitor program requests control of the microprocessor prior to execution of the interrupt handler in response to the virtual interrupt number.

33. The system of claim 21 wherein said logic circuitry comprises a first logic circuitry, and said microprocessor further comprises:

a virtual interrupt pending bit, wherein said virtual interrupt pending bit is set in a first state to indicate an interrupt is pending for a virtual program, and wherein said virtual interrupt pending bit is set in a second state to indicate an interrupt is not pending for the virtual program; and second logic circuitry for presenting a take virtual interrupt request signal to the monitor program in response to a combination of said interrupt flag bit and said virtual interrupt pending bit.

34. The microprocessor of claim 33 wherein said second logic circuitry presents the take virtual interrupt request signal to the monitor program in response to a combination of said interrupt flag bit being in the second state and said virtual interrupt pending bit being in the first state.

* * * * *

UNITED STATES PATENT AND TRADEMARK OFFICE
CERTIFICATE OF CORRECTION

PATENT NO. : 5,974,440
DATED : October 26, 1999
INVENTOR(S) : James E. Brooks, Robert R. Collins, Jonathan H. Shiell It is certified that error appears in the above-identified patent and that said Letters Patent is hereby corrected as shown below:

Title Page:
Insert item [60] under Related U.S. Applicaton Data
--Provisional Application No. 60/014,148 March 25, 1996.--

Signed and Sealed this

Nineteenth Day of June, 2001

Attest:

*Attesting Officer*

NICHOLAS P. GODICI
*Acting Director of the United States Patent and Trademark Office*